(No Model.)

D. McF. MOORE.
PHOSPHORESCENT ELECTRIC ILLUMINATION BY INTERMITTENT AND PERMANENT INTERRUPTION IN VACUUM.

No. 548,133. Patented Oct. 15, 1895.

WITNESSES:
A. L. Pfaff.
E. C. Deghuée.

INVENTOR
D. McFarlan Moore
BY
Edward P. Thompson
ATTORNEY.

ANDREW B.GRAHAM. PHOTO-LITHO. WASHINGTON.D.C.

UNITED STATES PATENT OFFICE.

DANIEL McFARLAN MOORE, OF NEW YORK, N. Y.

PHOSPHORESCENT ELECTRIC ILLUMINATION BY INTERMITTENT AND PERMANENT INTERRUPTION IN VACUUM.

SPECIFICATION forming part of Letters Patent No. 548,133, dated October 15, 1895.

Application filed January 24, 1895. Serial No. 536,038. (No model.)

*To all whom it may concern:*

Be it known that I, DANIEL MCFARLAN MOORE, a citizen of the United States, and a resident of New York, county and State of New York, have invented certain new and useful Improvements in Phosphorescent Electric Illumination by Intermittent and Permanent Interruptions in the Vacuum, (Case No. 17,) of which the following is a specification.

Heretofore I have pointed out in other applications that a conductor extending from vibrating terminals within a vacuum and not included in circuit with a given electric generator becomes luminous, and I have also pointed out that such a conductor will give sparks to earth connections. This invention relates to applications of these principles.

Figure 1:
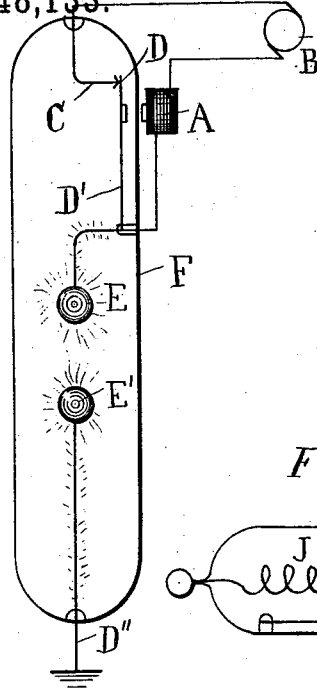
Figure 6:

Figure 1 is a view, practically in diagram, illustrating the manner of carrying out my invention, while Figs. 2, 3, 4, and 5 are similar views of specific inventions. Fig. 6 shows a modification of a detail.

Referring particularly to Fig. 1, A is the magnet in circuit with the generator B, which is also in circuit with terminals C and D, which are located within an evacuated tube F and normally in contact and provided with an armature within inductive action of the magnet A, all arranged in such a manner that the magnet causes rapid automatic interruptions of the terminals C and D. From one of the terminals—for example, D—there extends an electric conductor D', terminated by a ball E, located opposite a ball E', fastened to an earth connection D''.

The operation consists in operating the electric generator and thereby causing the interruption of the circuit at the terminals C and D. The terminal extension D' becomes luminous, because, it is thought, of the tendency of the electricity therein to flow to earth. In order that the electricity may not pass off from the extension D' to the earth connection D'', the balls E and E' are provided on the respective conductors, the result being not only the luminosity directly due to the interruptions at the terminals C and D, but also that which is due to the static electricity between the balls E and E'.

It is evident that the construction may be modified without departing from the spirit of the invention. For example, in Fig. 2, instead of having an earth connection, the terminals C and D each have an extension lettered, respectively, D' and C', terminated by balls E and E'. The difference of potential between these two balls located in the evacuated annular tube F' causes an illumination, and it is also true that an illumination results from the rapid interruptions of the terminals D and C. In this instance, the attractions of the armature, which is lettered G, are caused by the transformer, whose secondary coil is in circuit with the terminals C and D. The primary coils of the transformer H are in circuit with intermittent current-generator I''. By means of the transformer or converter H the effects of light are greater.

Figure 2:
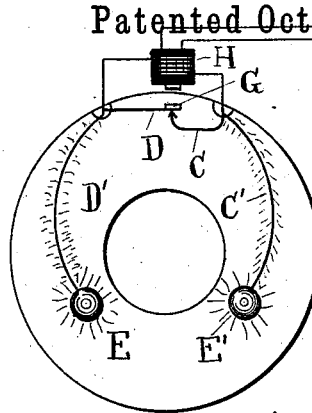
Figure 3:
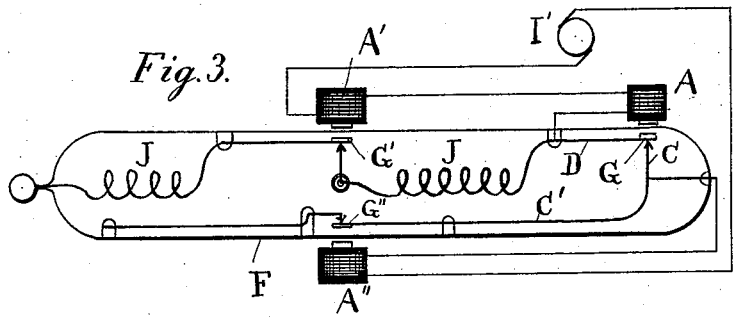

The idea forming the basis of the construction in Fig. 3 is the rapid interrupting of the extension of one of the terminals within a vacuum, instead of having them permanently separated, as in Fig. 1, or the rapid interrupting of both extensions, instead of placing them within inductive action, as in Fig. 2. To this end the terminal D is extended in Fig. 3 by the extension J, which may be coiled and which is broken up into separable parts at the armature G', mounted upon one of the parts and vibratory to and from the other part. The extension C' is similarly divided up, the armature for causing the interruptions thereof being lettered G''. All of the above-named parts are located in the tube F. There is a magnet for each armature, the same being lettered A, A', and A'', and being located in series with one another in circuit with the generator I', which may be either adapted to generate direct or alternating currents. The terminals C and D are in circuit with the magnet A. When the device is operated, these terminals C and D alternately separate and close, causing the illumination of the extensions J and C'. The current or static charge upon the said extensions, or both, become rapidly interrupted in view of the magnets A' A'' and the armature G' and G'', and consequently light is generated by these interruptions, as well as by the interruptions of the terminals C and D. The capacity or electric dimensions of the magnets A' and A'' should preferably be less than those of the magnet A, so that the vibrations of the armatures G' and G'' will be of less amplitude than those of the armature G. The reason of this is that it is desired to maintain continuous sparking at the points of interruption of the extensions as well as at the terminals C and D.

Figure 4:
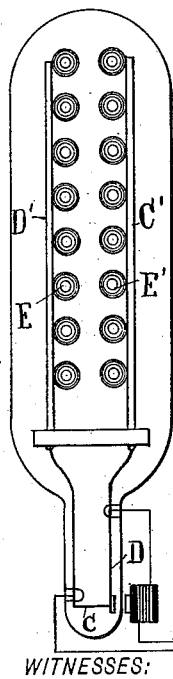

In Fig. 4 the terminals D' and C' are provided with many balls E and E', which are electrically fastened to the said terminals and extend through the evacuated space. The terminals D' and C' in this case are parallel to each other, while the terminals C and D are in circuit with the secondary coils K, which are provided with a circuit-closer L for varying the number of the coils in circuit, and therefore for varying the amount of light existing between the balls E and E'. I is the alternator for feeding the converter M, which has the primary coils K' and the secondary coils K.

Figure 5:
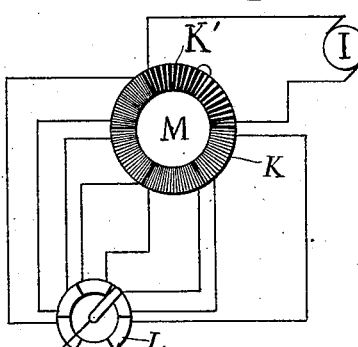

In Fig. 5 the two extensions D' and C' are arranged to be interrupted as to their metallic circuit with one another. The magnet for producing this effect is lettered A''', that is in circuit with the magnet A, so that it being assumed that there is a current flowing between the terminals C and D, it becomes interrupted by the action of the magnet M upon the armature G. During the actual contact and also during the separation there is an electrification upon the extensions D' and C', and these extensions during this current become closed by the magnet A''', or else partially closed and immediately interrupted. The vibration of the terminals operated by the magnet A''' causes supplementary light effects to those produced at the terminals C and D.

In Fig. 6 the extensions C' and D' are provided with a resistance N, instead of leaving a rarefied-air gap between them. As this is a comparatively high resistance there is not only the illumination of the resistance, but also of the rarefied atmosphere between the extensions and around the same.

I claim as my invention—

1. An electric phosphorescent illuminator, consisting of the combination with an evacuated inclosure of separable electric terminals therein, included in an electric circuit, a conductor forming an extension to one of the terminals and located in the inclosure, another conductor connected to earth and extending within the inclosure so that there is a rarefied air gap between itself and the said extension.

2. An electric phosphorescent illuminator, consisting of the combination with an evacuated inclosure of electric terminals therein, means for producing rapid interruptions of the terminals, which are included in an electric circuit, and electric conductors forming extensions of the said terminals independently of a return circuit and terminated by balls so that a rarefied air gap exists between the balls.

3. An electric phosphorescent illuminator, consisting of the combination with an evacuated inclosure of electric terminals therein, means for producing rapid interruptions of the terminals which are included in an electric circuit, and electric conductors forming extensions of the said terminal circuit and terminated by balls so that a rarefied air gap exists between the balls and an electric converter, whose one coil is in circuit with a given generator, and whose other coil is in circuit with the said terminals.

4. The combination with an evacuated inclosure of separable contacts therein, extensions from the contacts, and means for rapidly alternately breaking and closing the extensions.

5. The combination with an evacuated inclosure of electric terminals therein for alternately opening and closing the terminals, metallic conductors extending from the terminals through the evacuated space and divided into sections which are adapted to be metallically disconnected from each other at a second set of terminals located within the vacuum.

6. The combination with an evacuated inclosure of separable electric terminals therein, a magnet located in series with the terminals, metallic extensions from the terminals and located within the inclosure, and provided with separable electric contacts provided with armatures and magnets within inductive action of said armatures and located in series with the first named magnet, which is within inductive action of an armature attached to one of said first named terminals.

7. The combination with an evacuated inclosure of electric terminals therein between which a rarefied air gap exists, and means for breaking the conductors at points within the vacuum without removing the air gap.

8. The combination with an evacuated inclosure of separable electric terminals therein, and an electric resistance of less resistance than the rarefied atmosphere connecting the terminals around the points of separation, and located in the vacuum.

9. The combination with an evacuated inclosure of separable electric terminals therein, and electric conductors extending parallel to each other from the respective terminals and provided with balls.

10. The combination with an evacuated inclosure of separable electric terminals therein, and electric conductors extending parallel to each other from the respective terminals which are in circuit with a given electric converter that is provided with means of regulation.

11. The combination with an evacuated inclosure of two pairs of electric terminals located therein and included in branch electric circuits, one pair of terminals being normally closed and the other pair normally opened, and means for opening and closing the members of the respective pairs.

12. The combination with an evacuated inclosure of two pairs of electric terminals located therein and included in branch electric circuits, one pair of terminals being normally closed and the other pair normally opened, and means for opening and closing the members of the respective pairs, said means consisting of intermittently magnetized magnets within inductive action of armatures which are attached to said terminals.

In testimony that I claim the foregoing as my invention I have signed my name, in presence of two witnesses, this 8th day of January, 1895.

DANIEL McFARLAN MOORE.

Witnesses:
EDWARD P. THOMPSON,
W. G. HAVENS.